(12) United States Patent
Yamada

(10) Patent No.: US 8,465,160 B2
(45) Date of Patent: Jun. 18, 2013

(54) LIQUID TANK, VIEWING DEVICE FOR UNDER-LIQUID OBSERVATION, AND OPTICAL FILM

(75) Inventor: Nobuaki Yamada, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 0 days.

(21) Appl. No.: 13/200,945

(22) Filed: Oct. 5, 2011

(65) Prior Publication Data

US 2012/0019921 A1    Jan. 26, 2012

Related U.S. Application Data

(63) Continuation of application No. 12/864,072, filed as application No. PCT/JP2009/070198 on Dec. 1, 2009, now abandoned.

(30) Foreign Application Priority Data

Dec. 25, 2008  (JP) .................................. 2008-329996

(51) Int. Cl.
*G02B 27/00* (2006.01)
(52) U.S. Cl.
USPC ......................................................... 359/601
(58) Field of Classification Search
USPC .......................................... 359/601, 613, 614
See application file for complete search history.

(56) References Cited

U.S. PATENT DOCUMENTS

| | | | |
|---|---|---|---|
| 4,145,783 A * | 3/1979 | Rhodes | 441/135 |
| 2002/0044351 A1 | 4/2002 | Nilsen | |
| 2002/0044356 A1 | 4/2002 | Arakawa et al. | |
| 2003/0205475 A1 | 11/2003 | Sawitowski | |
| 2004/0163441 A1 | 8/2004 | Sawitowski | |
| 2005/0195486 A1 | 9/2005 | Sasaki et al. | |
| 2006/0050387 A1 * | 3/2006 | Arakawa et al. | 359/491 |
| 2007/0159698 A1 | 7/2007 | Taguchi et al. | |
| 2008/0032058 A1 | 2/2008 | Arakawa et al. | |
| 2008/0102603 A1 | 5/2008 | Kobayashi et al. | |
| 2008/0129933 A1 | 6/2008 | Nishida et al. | |
| 2009/0211912 A1 | 8/2009 | Taguchi et al. | |
| 2009/0252825 A1 | 10/2009 | Taguchi et al. | |
| 2010/0033819 A1 | 2/2010 | Schulz et al. | |

FOREIGN PATENT DOCUMENTS

| | | |
|---|---|---|
| CA | 2 407 209 | 10/2009 |
| DE | 195 36 194 | 4/1997 |
| DE | 102007009512 | 8/2008 |
| EP | 1 887 414 | 2/2008 |

(Continued)

OTHER PUBLICATIONS

Japanese Office Action mailed Oct. 5, 2010.

*Primary Examiner* — Hezron E Williams
*Assistant Examiner* — Nathaniel Kolb
(74) *Attorney, Agent, or Firm* — Harness, Dickey & Pierce, P.L.C.

(57) ABSTRACT

A liquid tank, a viewing device for under-liquid observation, and an optical film are disclosed, each excellent in visibility and durability and being easy to clean. In at least one embodiment of the present invention is directed to a liquid tank having a transparent wall, including, on an internal surface of the wall, a first moth-eye layer having a moth-eye structure, and a protective layer covering the moth-eye structure, in this order from the wall side, and preferably, further including, on an external surface of the wall, a second moth-eye layer having a moth-eye structure, and the second moth-eye layer being disposed in a region facing the first moth-eye layer.

7 Claims, 12 Drawing Sheets

FOREIGN PATENT DOCUMENTS

| | | |
|---|---|---|
| JP | 09-322674 | 12/1997 |
| JP | 2001-264520 | 9/2001 |
| JP | 2003-043203 | 2/2003 |
| JP | 2003-531962 | 10/2003 |
| JP | 2003-319733 * | 11/2003 |
| JP | 2005-156695 | 6/2005 |
| JP | 2005-181740 | 7/2005 |
| JP | 2005-249982 | 9/2005 |
| JP | 2007-199522 | 8/2007 |
| JP | 04-368384 | 9/2009 |
| JP | 2009-217278 | 9/2009 |
| WO | WO 2006/059586 | 6/2006 |
| WO | WO 2006/059686 | 6/2006 |

* cited by examiner (a)

(b)

(a)

(b)

(a)

(b)

(a)

(b)

(a)

(b)

(a)

(b)

(a)

(b)

LIQUID TANK, VIEWING DEVICE FOR UNDER-LIQUID OBSERVATION, AND OPTICAL FILM

CROSS-REFERENCE TO RELATED APPLICATIONS

This application is a continuation of and claims priority under 35 U.S.C. §§120/121 to U.S. patent application Ser. No. 12/864,072, filed on Jul. 22, 2010 now abandoned, which is a National Stage of International Application No. PCT/JP2009/070198, filed on Dec. 1, 2009, and which claims the benefit of Japanese Patent Application No. 2008-329996, filed on Dec. 25, 2008. The disclosures of each of the above applications are incorporated herein by reference in their entirety.

TECHNICAL FIELD

The present invention relates to liquid tanks, viewing devices for under-liquid observation, and optical films. More particularly, the present invention relates to: a liquid tank such as an aquarium tank and a tank with a liquid volume meter, suitably used as a container the inside of which is viewed through a transparent wall; a viewing device for under-liquid observation suitably used as a viewing device for underwater observation; and an optical film for the liquid tank or the viewing device.

BACKGROUND ART

The liquid tank includes an aquarium or observation container, and particularly tanks for raising and breeding fishes and the like thereinside are common. Such tanks are usually composed of a transparent material. In an aquarium tank containing water 21 as shown in FIG. 9, for example, ambient light is reflected on the external and internal (outer and inner surfaces) of an observer-side transparent plate (the transparent wall 11), and this makes it difficult for the observer to clearly view the inside of the tank and also to photograph it clearly because strobe light is reflected. With a view to clearly observe aquarium or food fishes raised or bred in the tank from the outside, modifications and improvements have been made not only for the tank itself such as a viewing window and a transparent wall but for maintenance tools installed on the tank, including an air pump and a cleaning tool.

For example, as a way of more clearly viewing underwater objects, it is commonly known that an anti-reflection thin film is coated on the external surface of a glass or acrylic resin transparent wall constituting a tank, or alternatively, an anti-reflection film is attached to it, thereby preventing reflection of ambient light on the external surface of the wall (hereinafter, also referred to as "external surface-reflection").

With regard to a technology for preventing reflection on an interface between a content of the tank and the internal surface (the interior of the tank) of the wall (hereinafter, also referred to as "internal surface-reflection") in addition to the external surface-reflection, for example, Patent Document 1 discloses that at least an observer-side one of the transparent walls constituting the tank has an anti-reflection function on its both surface.

Examples of the liquid tank also include a tank equipped with a window (viewing window) used as a liquid volume meter and through which objects present in the liquid can be viewed. Also in such a tank, reflection on the external and internal surfaces of the viewing window occurs in the matter of the above-described tank, so that an observer has a difficulty in accurately measuring the volume of the liquid.

In the tank inside which fishes are raised and bred, there is required to minimize or completely prevent adhesion of algae to the wall surface, thereby maintaining the wall surface clean and keeping the fishes in captivity healthy. As a technology of achieving it, for example, Patent Document 2 discloses a film for lining a water tank, provided with a tacky layer having the transparency and water resistance on one surface of a transparent resin film, further a release sheet or a sheet of paper on the surface thereof and a peeling off means for peeling at least one end of the release sheet or paper.

Similarly in the liquid tanks, the clear under-liquid observation is difficult also in viewing devices for under-liquid observation, including goggles and aquascopes. In goggles, for example, reflection on a lens surface might occur.

As a technology of preventing such surface reflection, a "moth-eye structure", a kind of nanostructure, is known in the field of optical materials. The moth-eye structure includes a great number of nanometer-sized conical protrusions formed on a transparent substrate surface, for example. As disclosed in Patent Documents 3 to 6, the moth-eye structure allows continuous change of the refractive index from air to the transparent substrate, so that incident light does not recognize the interface as an optical surface, and as a result, reflection of the light can be significantly decreased.

[Patent Document 1]
Japanese Kokai Publication No. 2003-319733
[Patent Document 1]
Japanese Kokai Publication No. Hei-09-322674
[Patent Document 1]
Japanese Kokai Publication No. 2003-43203
[Patent Document 1]
Japanese Kokai Publication No. 2005-156695
[Patent Document 1]
WO 2006/059686
[Patent Document 1]
Japanese Kokai Publication No. 2001-264520

DISCLOSURE OF INVENTION

When optical films having a surface with a nanostructure such as a moth-eye structure are used under water or another liquid of the tank, under-liquid life such as microorganism and algae tend to adhere to the film surface. This might look like stains and deteriorate the appearance, and further lead to a reduction in transmittance. For example, when a moth-eye structure 16 is used, a stain 31 such as underwater life is fixed to the features (the moth-eye structure 16) as illustrated in FIG. 10, and this stain is very difficult to remove, for example, even by washing with a cloth and the like because a fiber 32 of the cloth is generally much larger than the structure 16. Also in a viewing window-including tank or a viewing device each including the optical film, stains are easy to adhere to the film but it is difficult to remove them therefrom. When the technology disclosed in Patent Document 2 is employed as a measure against this stain, the release sheet or the sheet of paper for preventing this stain is disposed on the moth-eye structure, so that the anti-reflection function derived from the moth-eye structure can not be exhibited. Further, ambient light is reflected on the interface between media with different refractive indexes, i.e., water and the release sheet or the paper, and the viewing is significantly deteriorated as a result. Thus in the use of the nanostructure such as a moth-eye structure for the purpose of preventing the surface reflection on an aquarium or observation container, the film with the nanostructure is required to prevent the surface reflection and further suppress the stains that are generated due to the content of the container and to allow easy removal of the stains. Also in the use of the nanostructure such as a moth-eye structure for anti-surface reflection of the viewing device, the film with the nanostructure is required to prevent the surface reflection and further suppress the stains from adhering to a transparent window of the viewing device and to allow easy removal of the stains.

The technology of Patent Document 1 does not suffer from such a problem relating to the stains peculiar to the nanostructure because instead of the nanostructure, the multi-layer anti-reflection film is used. However, this multi-layer structure leads to poor wavelength dispersion characteristic of the anti-reflection film to cause coloring of reflected light. Further, unlike the film with the moth-eye structure, the multi-layer anti-reflection film can not decrease the reflectance to such a level that almost no surface reflection occurs. When disposed on the internal surface of a transparent wall or the external surface of a transparent window, for example, the multi-layer anti-reflection film is readily damaged by hit of fishes to the wall or window. That is, the multi-layer anti-reflection film usually has poor durability. As mentioned above, in the use of the multi-layer anti-reflection film for the purpose of anti-surface reflection, the film is required to provide further improved visibility by suppressing the coloring and reducing the reflectance and to show enhanced durability. The multi-layer anti-reflection film is an expensive material and requires complicated production steps, and therefore it might be lack in versatility.

The present invention is devised considering the aforementioned situations. An object of the present invention is to provide a liquid tank, a viewing device for under-liquid observation, and an optical film, each excellent in visibility and durability and being easy to clean.

The present inventors made various investigations on a liquid tank excellent in visibility and durability and easy to clean, and noted a moth-eye structure. The inventors found that the following effects can be achieved when not only the moth-eye structure but also a protective layer covering it are disposed on the internal surface of a transparent wall constituting the tank. First, the surface reflection, especially the internal surface-reflection, can be markedly decreased while the coloring is suppressed. Secondly, the durability on the internal surface of the tank is improved. Finally, the internal surface of the tank can be readily cleaned. Thus, the present inventors have found the solution of the aforementioned problems and arrived at the present invention.

The present invention is a liquid tank having a transparent wall, including, on an internal surface of the wall, a first moth-eye layer having a moth-eye structure, and a protective layer covering the moth-eye structure, in this order from the wall side. This liquid tank is excellent in visibility and durability and easy to clean. Further, the liquid tank can be produced at a much lower cost than in use of other anti-reflection films such as a multi-layer anti-reflection film.

The liquid tank of the present invention may or may not include other components as long as it essentially includes the above-mentioned components, and the configuration thereof is not especially limited.

The following will mention preferable embodiments of the liquid tank of the present invention in detail. The following embodiments may be appropriately employed in combination.

With a view to significantly decrease the external surface-reflection and further improve the visibility, it is preferable that the liquid tank further includes, on an external surface of the wall, a second moth-eye layer having a moth-eye structure, and the second moth-eye layer being disposed in a region facing the first moth-eye layer.

For further improvement in durability, it is preferable that the protective layer contains a fluorine-containing resin. The fluorine-containing resin generally has a refractive index of about 1.3 to 1.4, so that the refractive index of the protective layer containing such a resin can be readily made substantially equivalent to that of water. That is, according to this, the liquid tank of the present invention can be suitably used as a water tank.

It is preferable that the protective layer has a refractive index substantially equivalent to that of a liquid to be stored in the tank. According to this, the effects of the present invention can be more surely exhibited.

It is preferable that the protective layer has a refractive index substantially equivalent to that of water. According to this, the liquid tank of the present invention can be suitably used as a water tank.

It is preferable that the protective layer has a refractive index smaller than that of each of the transparent wall and the first moth-eye layer. According to this, the transparent wall and the first moth-eye layer can be composed of the respective appropriate materials, and the refractive index of a liquid to be stored in the tank can be readily made substantially equivalent to that of the protective layer.

It is preferable that the protective layer has a refractive index of 1.28 to 1.38. According to this, the liquid tank of the present invention can be suitably used as a water tank.

The present invention is also an optical film attached to an internal surface of a liquid tank having a transparent wall, the film including a moth-eye layer having a moth-eye structure and a protective layer covering the moth-eye structure (hereinafter, also referred to as a "first optical film of the present invention"). The liquid tank of the present invention can be easily and inexpensively provided by attaching the first optical film of the present invention to the internal surface of the transparent wall.

The first optical film may or may not include other components as long as it essentially includes the above-mentioned components, and the configuration thereof is not especially limited.

The following will mention preferable embodiments of the first optical film of the present invention. The following embodiments may be appropriately employed in combination.

For further improvement in durability, it is preferable that the protective layer contains a fluorine-containing resin. The fluorine-containing resin generally has a refractive index of about 1.3 to 1.4, so that the refractive index of the protective layer containing such a resin can be easily made substantially equivalent to of water. That is, according to this, the liquid tank including the first optical film of the present invention attached thereto can be suitably used as a water tank.

It is preferable that the protective layer has a refractive index substantially equivalent to that of a liquid to be stored in the tank. According to this, the effects of the present invention can be more surely exhibited.

It is preferable that the protective layer has a refractive index substantially equivalent to that of water. According to this, the liquid tank including the first optical film of the present invention attached thereto can be suitably used as a water tank.

It is preferable that the protective layer has a refractive index smaller than that each of the transparent wall and the moth-eye layer. According to this, the transparent wall and the moth-eye layer can be composed of the respective appropriate materials, and the refractive index of a liquid to be stored in the tank including the first optical film of the present invention can be readily made substantially equivalent to that of the protective layer.

It is preferable that the protective layer has a refractive index of 1.28 to 1.38. According to this, the liquid tank including the first optical film of the present invention attached thereto can be suitably used as a water tank.

The present invention is also a viewing device having a transparent window for under-liquid observation, the device including, on an outer surface of the window, a first moth-eye layer having a moth-eye structure, and a protective layer covering the moth-eye structure, in this order from the window side. This viewing device is excellent in visibility and durability and easy to clean. Further, the viewing device including such layers can be produced at a much lower cost than in use of other anti-reflection films such as a multi-layer anti-reflection film.

The viewing device of the present invention may or may not include other components as long as it essentially includes the above-mentioned components, and the configuration thereof is not especially limited.

The following will mention preferable embodiments of the viewing device of the present invention. The following embodiments may be appropriately employed in combination.

With a view to markedly decrease reflection of ambient light on the internal surface of the transparent window to further improve the visibility, it is preferable that the viewing device further includes, on an inner surface of the window, a second moth-eye layer having a moth-eye structure, and the second moth-eye layer being disposed in a region facing the first moth-eye layer.

For further improvement in durability, it is preferable that the protective layer contains a fluorine-containing resin. The fluorine-containing resin generally has a refractive index of about 1.3 to 1.4, so that the refractive index of the protective layer containing such a resin can be easily made substantially equivalent to that of water. That is, according to this, the viewing device of the present invention can be suitably used as a device for underwater observation.

It is preferable that the protective layer has a refractive index substantially equivalent to that of a liquid to be in contact with the device. According to this, the effects of the present invention can be more surely exhibited.

It is preferable that the protective layer has a refractive index substantially equivalent to that of water. According to this, the viewing device of the present invention can be suitably used as a device for underwater observation.

It is preferable that the protective layer has a refractive index smaller than that of each of the transparent window and the first moth-eye layer. According to this, the transparent window and the first moth-eye layer can be composed of the respective appropriate materials, and the refractive index of a liquid to be in contact with the device can be readily made substantially equivalent to that of the protective layer.

It is preferable that the protective layer has a refractive index of 1.28 to 1.38. According to this, the viewing device of the present invention can be suitably used as a device for underwater observation.

The present invention is also an optical film attached to an outer surface of a viewing device having a transparent window for under-liquid observation, the film including a moth-eye layer having a moth-eye structure and a protective layer covering the moth-eye structure (hereinafter, also referred to as a "second optical film of the present invention"). The viewing device of the present invention can be readily and inexpensively provided by attaching the second optical film of the present invention to the external surface of the window.

The second optical film of the present invention may or may not include other components as long as it includes the above-mentioned components, and the configuration thereof is not especially limited.

The following will mention preferable embodiments of the second optical film of the present invention. The following embodiments may be appropriately employed in combination.

For further improvement in durability, it is preferable that the protective layer contains a fluorine-containing resin. The fluorine-containing resin generally has a refractive index of about 1.3 to 1.4, so that the refractive index of the protective layer containing such a resin can be easily made substantially equivalent to that of water. That is, according to this, the viewing device including the second optical film of the present invention attached thereto can be suitably used as a device for underwater observation.

It is preferable that the protective layer has a refractive index substantially equivalent to that of a liquid to be in contact with the device. According to this, the effects of the present invention can be more surely exhibited.

It is preferable that the protective layer has a refractive index substantially equivalent to that of water. According to this, the viewing device including the second optical film of the present invention attached thereto can be suitably used as a device for underwater observation.

It is preferable that the protective layer has a refractive index smaller than that of each of the transparent window and the moth-eye layer. According to this, the transparent window and the moth-eye layer can be composed of the respective optimum materials, and the refractive index of a liquid to be in contact with the viewing device including the second optical film of the present invention can be readily made substantially equivalent to that of the protective layer.

It is preferable that the protective layer has a refractive index of 1.28 to 1.38. According to this, the viewing device including the second optical film of the present invention attached thereto can be suitably used as a device for underwater observation.

EFFECT OF THE INVENTION

The liquid tank and the first optical film of the present invention can provide a liquid tank excellent in visibility and durability and easy to clean. More specifically, the use of the liquid tank and the first optical film of the present invention allows a marked decrease in coloring and an improvement in durability of the internal surface of the liquid tank, and further allows easily cleaning the internal surface of the tank. Further, the refractive index of the protective layer can be easily made substantially equivalent to that of a liquid to be stored in the tank. As a result, the reflection on the surfaces, particularly on the internal surface of the tank can be markedly decreased. In addition, the protective layer and air are usually different in refractive index, so that the liquid level in the tank can be readily determined by being viewed from the outside through the transparent wall.

The viewing device and the second optical film of the present invention can provide a viewing device for under-liquid observation excellent in visibility and durability and easy to clean. More specifically, the use of the viewing device and the second optical film of the present invention allows a marked decrease in coloring and an improvement in durability of the external surface of the viewing device, and further allows easily cleaning the external surface of the device.

Further, the refractive index of the protective layer can be easily made substantially equivalent to that of a liquid to be in contact with the device. As a result, the reflection of ambient light on the surfaces, particularly on the external surface, of the device can be markedly decreased.

BRIEF DESCRIPTION OF DRAWINGS

FIG. 1(a) is an overall cross-sectional view of the tank. FIG. 1(b) is an enlarged view of a region (side surface) surrounded by the broken line of FIG. 1(a).

FIG. 4(a) is a side cross-sectional view of the tank. FIG. 4(b) is a graph showing refractive index change on a side surface of the tank.

FIG. 5(a) is an overall cross-sectional view of the tank. FIG. 5(b) is an enlarged view of a region (side surface) surrounded by the broken line of FIG. 5(a).

FIG. 7(a) is a cross-sectional view of a liquid volume meter portion of the tank. FIG. 7(b) is a graph showing refractive index change in the liquid volume meter portion.

FIG. 8(a) is a schematic view showing a cross-section of the moth-eye structure. FIG. 8(b) shows refractive index change in the structure.

FIG. 12(a) is a cross-sectional view of the device. FIG. 12(b) is a graph showing refractive index change in the device.

FIG. 16(a) is a cross-sectional view of the device. FIG. 16(b) is a graph showing refractive index change in the device.

BEST MODES FOR CARRYING OUT THE INVENTION

Figure 1:
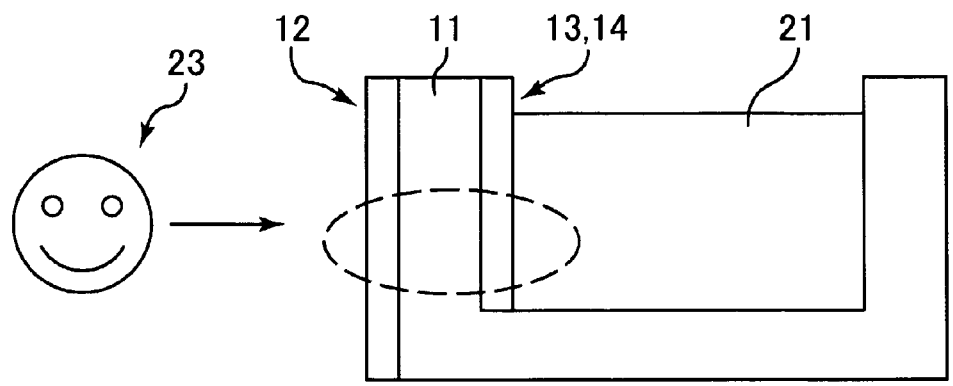
FIG. 1 is a schematic view showing a liquid tank of Example 1.
Figure 1:
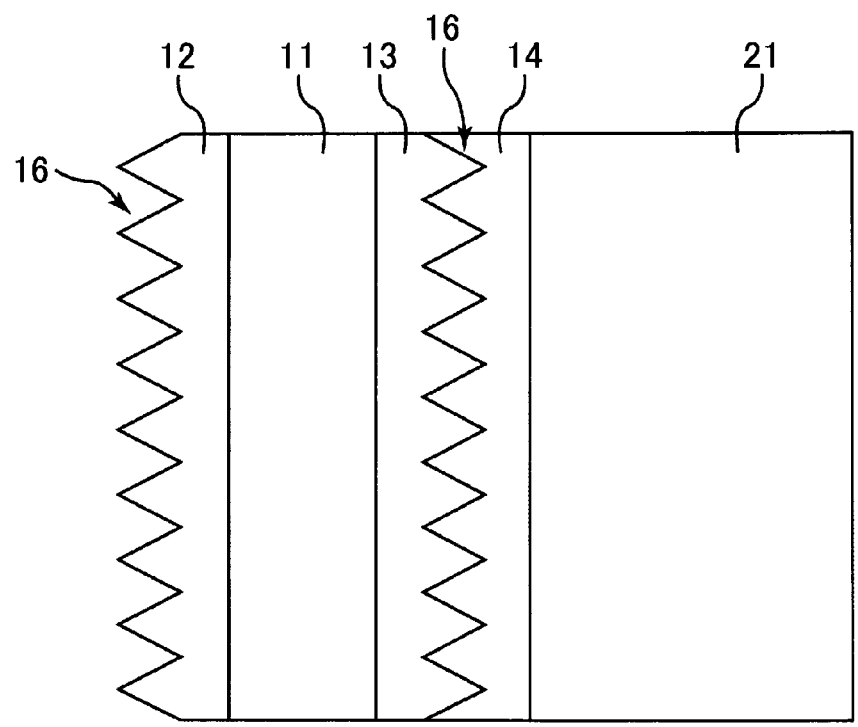

The present invention will be explained in more detail below on the basis of Embodiments, with reference to accompanying drawings. The present invention, however, is not limited to these Embodiments.

In the present description, when one member has a refractive index substantially equivalent to that of another member, the refractive indices thereof is not necessarily completely the same and may be substantially the same to such a degree that the effects of the present invention are exhibited.

In the present description, the refractive index is expressed as a value measured at a wavelength of 589 nm (D ray) at a room temperature (25° C.).

Embodiment 1

The liquid tank of Embodiment 1 has a transparent wall, and on the internal surface of the wall, a first moth-eye layer having a moth-eye structure and a protective layer covering the moth-eye structure are disposed in this order from the wall side.

Inside the tank of the present Embodiment, a material containing at least a liquid is stored. An observer views the content of the tank, such as under-liquid objects (e.g., living creatures), the liquid level, the liquid itself from the outside through the transparent wall. Thus, the tank of the present Embodiment is suitably used as an aquarium or observation tank, including a water tank and a tank with a viewing window.

According to the tank of the present Embodiment, the first moth-eye layer having a moth-eye structure allows markedly reducing light reflection on the interface between the first moth-eye layer and the protective layer (e.g., a reflectance of 0.1% or lower). The transparent wall and the liquid (hereinafter, also referred to as a "content liquid") to be stored in the tank are usually different in refractive index. The material for the first moth-eye layer can be appropriately selected from those having a refractive index substantially equivalent to that of the transparent wall. The material for the protective layer can be appropriately selected from those having a refractive index substantially equivalent to that of the content liquid. Specifically, the first moth-eye layer ensures the refractive index compatibility with the transparent wall, and the protective layer ensures that with the content liquid. As a result, the refractive index can be continuously changed from the content liquid to the transparent wall, so that the internal-surface reflection in a region below the liquid level can be markedly decreased (e.g., a reflectance of 0.1% or lower).

Patent Document 6 discloses a reflection preventing film that includes a transparent layer composed of hardened matter of an ionizing radiation-setting resin composition. On one surface of the transparent layer, a structure provided with a projecting and recessing part on which countless fine projections and recessions are formed with a pitch shorter than the wavelength of light. Further, a layer (coating layer 4) composed of a resin composition and having a refractive index lower than that of the transparent layer is laminated on the fine projections and recessions. It is also disclosed that the material with a refractive index of 1.3 to 1.4 is used for the surface layer 4. However, reflection of about 2% occurs on the interface between air (refractive index of 1) and this surface layer 4 (refractive index of 1.35), for example, when the layer 4 has a refractive index of 1.35. Thus, this anti-reflection film is poor in the effect of reducing unnecessary reflection.

The anti-reflection mechanism derived from the moth-eye structure excludes λ/4 conditions unlike in the use of the multi-layer anti-reflection film, and therefore coloring can be almost completely prevented.

The liquid tank includes the protective layer covering the moth-eye structure in addition to the first moth-eye layer, and materials excellent in durability can be appropriately determined as a material for the protective layer. Accordingly, the durability of the internal surface of the tank can be improved.

Since the moth-eye structure is covered by the protective layer, adherence of stains to the moth-eye structure, from which the stains are difficult to remove, can be prevented. The shape of a portion to be in contact with the content liquid (surface shape) of the protective layer is not especially limited, and therefore the surface can be formed to be more flat than the moth-eye structure. Even when adhered to the protective layer, the stains can be readily removed therefrom.

The refractive index of the protective layer, which is substantially equal to that of the content liquid, is usually different from that of air. In the region below the content liquid level, the reflective indices of the respective members are made substantially equal to each other. In the region above the level (generally the region exposed to air), the refractive indices of the respective members are not matched and as a result of this, the internal surface-reflection occurs. Based on this difference in occurrence of the internal-surface reflection between the regions below and above the content liquid, the position (level) of the content liquid can be readily determined by being viewed from the outside through the transparent wall.

The moth-eye structure of the present invention can be formed, for example, by coating a UV-curable resin on a base film or a mold surface, pressing the film against the mold, and curing the resin coating by UV radiation through the base film. This allows producing the liquid tank dramatically inexpensively in comparison to use of other anti-reflection films such as a multi-layer film (multi-layer anti-reflection film) requiring expensive processes involving two or more coating processes, deposition processes, and the like.

It is preferable that the liquid tank includes, on the external surface of the transparent wall, a second moth-eye layer having a moth-eye structure, and the second moth-eye layer is disposed in a region facing the first moth-eye layer. This second moth-eye layer allows markedly reducing the external surface-reflection (e.g., a reflectance of 0.1% or lower). As a result of this, the reflection on the region where the first and second moth-eye layers overlap with each other can be further decreased. The first and second moth-eye layers are disposed so as to overlap with each other in the viewing direction. Between the first and second moth-eye layers, the shape, size, and location thereof may be the same or different but preferably the same.

The location of the first and second moth-eye layers and the protective layer is not especially limited as long as they can be viewed from an observer. Examples thereof include a side surface, an upper surface, and a bottom surface of the tank. The first and second moth-eye layers and the protective layer may be formed over the entire or part of the transparent wall, but preferably formed on at least part through which the observer views the content of the tank. Specifically, when the liquid tank of the present Embodiment is used in an application where the viewing direction is predetermined, the first and second moth-eye layers and the protective layer may be disposed only on the transparent wall facing the observer, not on all the walls.

The moth-eye structure is not especially limited as long as it includes a large number of nanometer-sized protrusions. Specifically, the moth-eye structure includes, but is not especially limited to, a large number of protrusions each having a height (depth) of 1 nm or larger and smaller than 1 μm (=1000 nm). More specifically, the moth-eye structure preferably includes protrusions whose pitch (a distance between tops of adjacent ones of the protrusions) and height are each smaller than a visible light wavelength (380 nm to 780 nm), and more preferably includes substantially conical protrusions each of which has a pitch of 50 nm to 300 nm and a height of 50 nm to 300 nm. The thickness of each of the first and second moth-eye layers is generally, but not limited to, about 1 μm to 30 μm.

Figure 8:
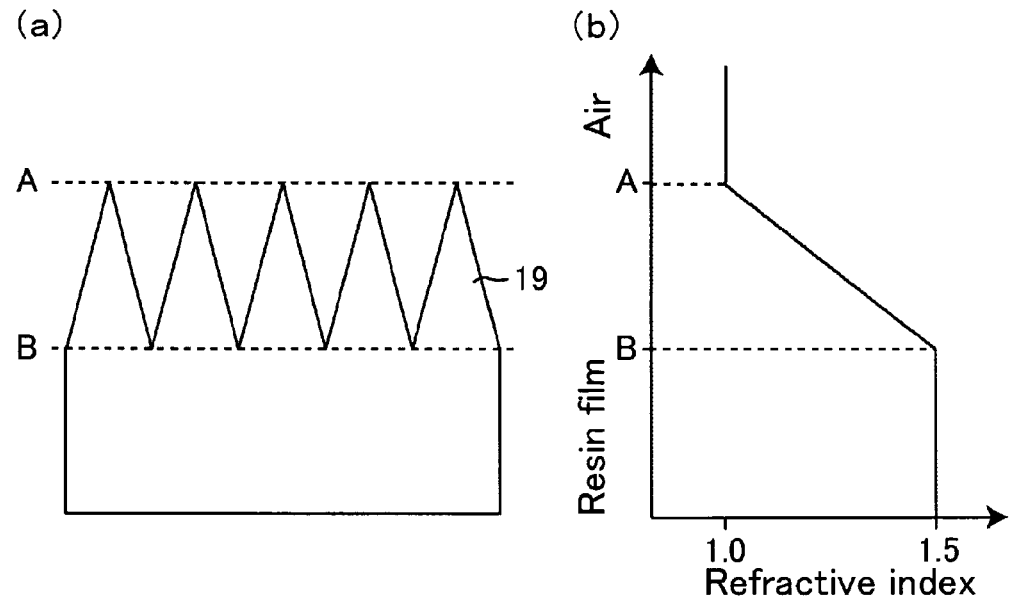
FIG. 8 is an explanation view of a moth-eye structure (the view for explaining the principle of continuous refractive index change from the surface and the marked reflection decrease on the interface).
Figure 9:
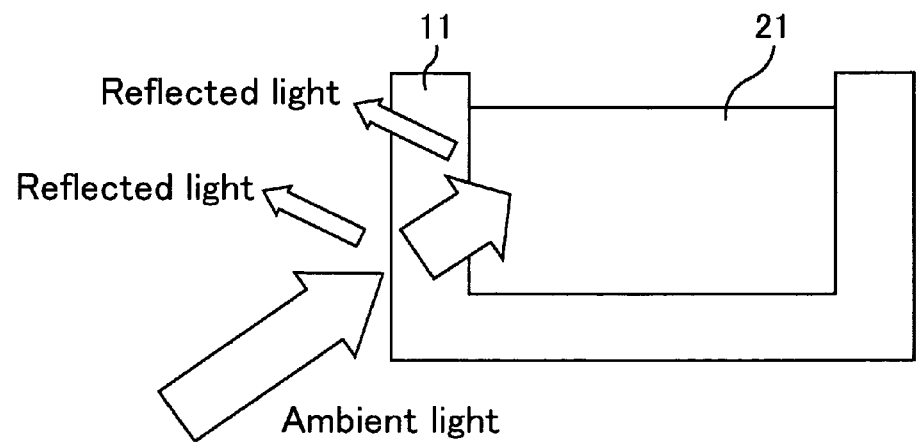
FIG. 9 is a cross-sectional view schematically showing a conventional aquarium tank.
Figure 10:
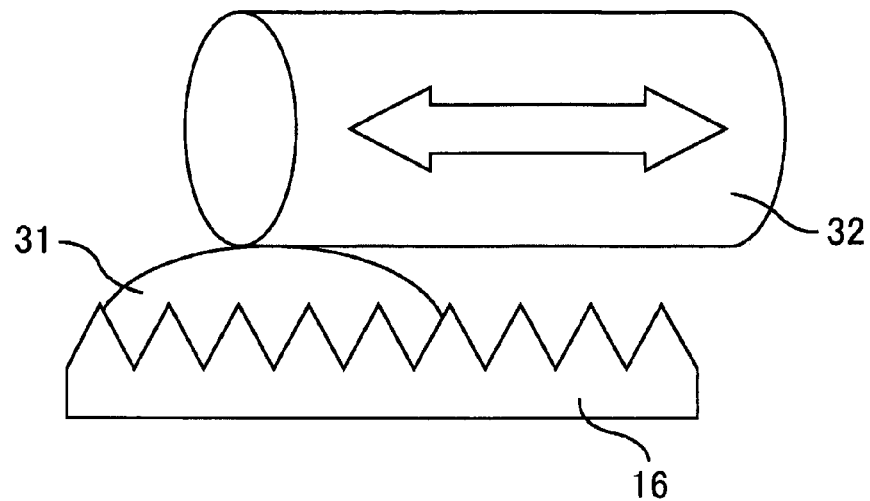
FIG. 10 is a cross-sectional view schematically showing a state where a stain has adhered to a conventional moth-eye structure.

This surface structure is typically called "moth-eye structure" and a film with this structure is known as an ultra-low reflection film allowing a reflectance of 0.1% or lower for visible light, for example. FIG. 8 is an explanation view of a moth-eye structure (the view for explaining the principle of continuous refractive index change from the surface and the marked reflection decrease on the interface). FIG. 8(a) is a schematic view showing a cross-section of the moth-eye structure. FIG. 8(b) shows refractive index change in the moth-eye structure. FIG. 8 shows the case where the moth-eye structure is exposed to air. The moth-eye structure-including film typically has protrusions 19 smaller than a visible light wavelength (380 nm to 780 nm) as shown in FIG. 8(a), and as shown in FIG. 8(b), the interface refractive index can be regarded to gradually and continuously increase from the refractive index of the medium (air) on the film surface (refractive index of air is 1.0) to a value equivalent to the refractive index of a material constituting the film (for example, a refractive index of a resin is ordinarily about 1.5). As a result, no refractive index interface substantially exists, and the reflectance on the interface is significantly decreased.

The moth-eye structure can be formed by nanoimprint, including UV nanoimprint and thermal imprinting. Particularly preferably, an aluminum substrate with nanometer-sized cavities formed on its surface by anodization is used as a mold. More specifically, the mold with nanometer-sized cavities can be prepared by cut-polishing an outer circumference surface of a conical or cylindrical aluminum tube formed by extruding, and alternately repeating, for example, three times, anodization and etching for the cut-polished aluminum surface (outer circumference surface). According to this method involving anodizing, nanometer-sized recesses can be formed in a random placement and in a uniform distribution, and seamless nanostructures needed for continuous production can be formed on a columnar or cylindrical mold roller surface. Accordingly, the seamless nanostructures can be continuously transferred to a workpiece (for example, a UV-curable or thermocurable resin film).

The materials for the first and second moth-eye layers are not especially limited. It is preferable that the refractive index of each of the first and second moth-eye layers is substantially equivalent to that of the transparent wall. More specifically, the difference in refractive index between the transparent wall and the first and second moth-eye layers is preferably 0.05 (more preferably 0.03) or smaller, and in this case, the reflection on the both interfaces can be hardly recognized.

The other optical characteristics of the first and second moth-eye layers are not especially limited and may be the same as those of common moth-eye films. The first and second moth-eye layers are preferably transparent to such a degree that an observer can view the content of the tank. More specifically, it is preferable that: the light transmittance is 90% (more preferably 95%) or higher; the haze is preferably 10% (more preferably 1%) or lower; the refractive index is 1.45 to 1.55 (more preferably 1.47 to 1.53).

In view of readily preparing the first and second moth-eye layers by the above-mentioned nanoimprint, resins that can be cured by energy beams, e.g., electromagnetic waves such as UV light and visible light or thermocurable resins are preferably used as the material for the first and second moth-eye layers.

Each of the first and second moth-eye layers may be (1) formed on the transparent wall with a base film therebetween or may be (2) directly formed on the transparent wall.

According to the embodiment (1), an optical film including the moth-eye structure-containing layer and the protective layer covering the moth-eye structure; and an optical film having a moth-eye structure-including layer can be preferably used. Specifically, mass-produced films formed by nanoimprint can be used, which allows an improvement in productivity of the liquid tank of the present Embodiment.

Another Embodiment of the present invention provides such an optical film. The present Embodiment provides an optical film (film for the tank internal surface) attached to the internal surface of the liquid tank of Embodiment 1, i.e., the liquid tank having a transparent wall, the optical film including a moth-eye layer having a moth-eye structure (the above-mentioned first moth-eye layer) and a protective layer covering the moth-eye structure (the moth-eye structure of the above-mentioned first moth-eye layer).

The base film is a base for supporting a material (for example, a UV-curable or thermocurable resin) for the (first and/or second) moth-eye layer during the production steps. It is preferable that the base film has transparency, and resistances to water and solvent (liquid). The base film preferably has a refractive index substantially equivalent to that of each of the first and second moth-eye layers and the transparent wall. More specifically, the difference in refractive index among them is preferably 0.05 or smaller (more preferably 0.03 or smaller), and in this case, the reflection on the both interfaces can be hardly recognized. From the same viewpoint, the difference in refractive index between adjacent ones of these members is preferably 0.05 or smaller (more preferably 0.03 or smaller).

The other optical characteristics of the base film are not especially limited and may be the same as those of a base for common optical films. The base film is preferably transparent to such a degree that an observer can recognize the contents of the tank. More specifically, it is preferable that the base film has a light transmittance of 90% (more preferably 95%) or higher, a haze of 10% (preferably 1%) or lower, and a refractive index of 1.55 to 1.45 (more preferably 1.53 to 1.47).

The optical film of the present Embodiment is preferably a transparent film with transparency, waterproof property, and resistances to water and solvent (liquid). The optical characteristics of the entire optical film of the present Embodiment are not especially limited. The optical film is preferably transparent to such a degree that an observer can recognize the contents of the tank. More specifically, it is preferable that the optical film has a light transmittance of 90% (more preferably 95%) or higher and a haze of 10% (more preferably 1%) or lower.

Specific examples of the base film include ZEONOR by ZEON Corp., ARTON by JSR Corp., COC and TPX each by Mitsui Chemicals, Inc. Olefin films are preferably used as the base film. The thickness of the base film is generally, but not limited to, about 30 μm to 100 μm.

According to the embodiment (1), it is preferable that the optical film of the present Embodiment has an adhesive paste on a (first or second) moth-eye layer-free-side surface of the base film. The adhesive paste (adhesive) is used for attaching the optical film of the present Embodiment to the interior of the tank easily, and preferably has transparency and water resistance. Specifically, the adhesive paste can be disposed by coating an acrylic adhesive and the like on a single surface of the base film by a publicly known method, and the thickness of the paste can be appropriately determined. According to the embodiment (1), the optical film of the present Embodiment may further include an easy-peelable laminate film on the adhesive paste.

The embodiment (2) excludes use of the members such as the base film and the adhesive paste, which permits a reduction in cost of the liquid tank of the present Embodiment. Neither reflection nor reduction in light transmittance caused by the base film and the adhesive paste occur, resulting in further improvement in visibility of the liquid tank. The embodiment (2) can be achieved by, for example, coating a UV-curable or thermocurable resin directly on a transparent wall and then transferring moth-eye structures of a soft mold to the resin coating by the above nanoimprint.

It is preferable that the protective layer has a refractive index substantially equivalent to that of a liquid (content liquid) to be stored in the tank. According to this, the effects of the present Embodiment can be more surely exhibited. More specifically, the difference in refractive index between the protective layer and the content liquid is 0.05 (more preferably 0.03) or smaller. In this case, the reflection on the interface between the protective layer and the content liquid can be hardly recognized. The refractive index of the protective layer is preferably within a range of the refractive index of the content liquid ±0.05 (more preferably ±0.03).

It is preferable that the protective layer has a refractive index substantially equivalent to that of water. According to this, the liquid tank of the present Embodiment can be preferably used as a tank for storing water, i.e., as a water tank. More specifically, the difference in refractive index between the protective layer and water is 0.05 (more preferably 0.03) or smaller. In this case, the reflection on the interface between the protective layer and the water can be hardly recognized.

The refractive index of water is about 1.33, and so it is preferable that the protective layer has a refractive index of 1.28 to 1.38 (more preferably 1.3 to 1.36) in view of suitably using the liquid tank of the present invention as a water tank.

According to the present Embodiment, the transparent members having a refractive index of about 1.5 such as a glass or transparent resin material can be preferably used as a material for the transparent wall. Further, transparent members having a refractive index of about 1.5 such as a transparent resin material can be suitably used as a material for the first moth-eye layer. These transparent members each have a refractive index higher than that of the content liquid (e.g., 1.33 of water refractive index), generally. With a view to form the transparent wall and the first moth-eye layer by the respective optimum materials and to easily make the refractive index of the content liquid substantially equivalent to that of the protective layer, it is preferable that the protective layer has a refractive index smaller than that each of the transparent wall and the moth-eye layer.

The other optical characteristics of the protective layer are not especially limited. The optical film is preferably transparent to such a degree that an observer can recognize the contents of the liquid tank. More specifically, it is preferable that: the light transmittance is 90% (more preferably 95%) or higher; and the haze is preferably 10% (more preferably 1%) or lower.

It is preferable the protective layer contains a fluorine-containing resin. According to this, the protective layer can more surely protect the moth-eye structure, which is commonly poor in durability, and as a result, the durability of the liquid tank of Embodiment 1 can be more improved. Since the refractive index of the fluorine-containing resin is generally about 1.3 to 1.4, the refractive index of the protective layer containing a fluorine-containing resin can be easily made substantially equal to that of water. That is, according to this, the liquid tank of the present Embodiment can be preferably used as a water tank. The protective layer can be formed by coating a material for the protective layer on the first moth-eye layer by a common coating method (including, spray, spin coating, die coating, slit coating, and the like), and drying the coating if necessary.

The fluorine-containing resin is a resin including a carbon-fluorine bond, and the resin itself has water repellency: CYTOP CTX 809A by ASAHI Glass Co., Ltd., is mentioned as a specific example of the fluorine-containing resin. The thickness of the protective layer is generally, but not limited to, about 1 μm to 5 μm.

The adhesion of the protective layer possibly deteriorates when a resin material (a polymer material) is used for the first moth-eye layer and a fluorine-containing resin material (fluorine resin material) is coated on the first moth-eye layer as a material for the protective layer. In view of this, it is preferable that prior to the coating of the protective layer material, the first moth-eye layer surface is treated with a primer.

The flatness of the protective layer surface is not especially limited as long as it is more flat than the moth-eye structure of the first moth-eye layer. It is preferable that the protective layer surface is flat to such a degree that stains on the surface can be removed by a common washing way (e.g., wiping or rubbing) with a common tool (e.g., cloth or brush). There is no problem in that the protective layer surface has a flatness that is allowed when the protective layer is composed of a resin material by a common coating method such as spraying, spin coating, die coating, and slit coating.

The transparent wall is transparent to such a degree that an observer can view the under-liquid objects therethrough, and can be composed of a material commonly used in typical water tanks or viewing windows. More specifically, it is preferable that the transparent wall has a light transmittance of 90% (more preferably 95%) or higher and a haze of 10% (more preferably 1%) or lower. The refractive index of the transparent wall is preferably, but not limited to, substantially equivalent to that of the base film of the moth-eye layer or the resin constituting the moth-eye structure. According to this, the effects of the present Embodiment can be sufficiently exhibited.

Examples of the material for the transparent wall include, but not limited to, various glass materials and transparent resin (e.g., acrylic resin) materials. Such materials include those generally used for water tanks or viewing windows.

The transparent wall constitutes the entire or part of the liquid tank of the present Embodiment. Specifically, the transparent wall may be a transparent window.

As long as the liquid tank is a container (appreciation or observation container) the interior of which is viewed from the outside, the application thereof is not especially limited. Particularly preferable are aquarium tanks in which fishes are raised and bred and tanks having as a liquid volume meter a window (viewing window) through which the content is viewed.

The liquid (the content liquid) stored in the tank is in contact with at least part of the protective layer, preferably. The kind and refractive index of the content liquid can be appropriately determined according to the application of the tank and are not especially limited. Preferably, the content liquid is water. The content of the tank is not especially limited to liquid materials and include underwater life such as fishes and microorganism, and ornamentals.

Embodiment 2

The viewing device for under-liquid observation of Embodiment 2 includes a transparent window, and on the external surface of the window, a first moth-eye layer having a moth-eye structure and a protective layer covering the moth-eye structure are disposed in this order from the window side.

The external surface of the transparent window means a surface on the side opposite to the observer side.

Thus, in Embodiment 2, the first moth-eye layer and the protective layer mentioned in Embodiment 1 are applied to a viewing device for under-liquid observation. Embodiment 2 is mentioned below mainly with reference to embodiments and effects different from those in Embodiment 1, and the same contents are omitted.

The viewing device of the present Embodiment is used with at least the transparent window being in contact with liquid.

Through this transparent window, the observer views under-liquid objects.

The viewing device of the present Embodiment includes the first moth-eye layer having a moth-eye structure, so that the reflection on the interface between the first moth-eye layer and the protective layer can be markedly decreased (e.g., a reflectance of 0.1% or lower). The transparent window and the liquid in contact with the viewing device (transparent window) (hereinafter, also referred to simply "liquid") are usually different in refractive index. The material for the first moth-eye layer can be appropriately selected from those having a refractive index equivalent to that of the transparent window. The material for the protective layer can be appropriately selected from those having a refractive index substantially equivalent to that of the liquid. Specifically, the first moth-eye layer ensures the refractive index compatibility with the transparent window, and the protective layer ensures that with the liquid. As a result, the refractive index can be continuously changed from the liquid to the transparent wall, so that reflection of ambient light on the external surface of the window can be markedly decreased (e.g., a reflectance of 0.1% or lower).

For the same reasons as in Embodiment 1 the viewing device of Embodiment 2 can exhibit the following effects:
 coloring can be almost completely suppressed;
 the durability of the external surface of the transparent window can be improved; and
 adhesion of stains to the moth-eye structure can be prevented. Moreover, the shape of the liquid-contacting portion (surface) of the protective layer is not especially limited, so that it can be made more flat than the moth-eye structure. Therefore, even when adhered to the protective layer, the stains can be readily removed therefrom.

Further, it is possible to produce the liquid tank dramatically inexpensively in comparison to the case where other anti-reflection films such as a multi-layer film (multi-layer anti-reflection film) are used.

It is preferable that the viewing device includes, on the internal surface of the transparent window, a second moth-eye layer having a moth-eye structure, and the second moth-eye layer is disposed in a region facing the first moth-eye layer.

The internal surface of the transparent window means a surface on the observer side.

This second moth-eye layer allows markedly reducing reflection of ambient light on the window internal surface (e.g., a reflectance of 0.1% or less). As a result of this, the reflection on the region where the first and second moth-eye layers overlap with each other can be further decreased. The first and second moth-eye layers are disposed so as to overlap with each other in the viewing direction. Between the first and second moth-eye layers, the shape, size, and location thereof may be the same or different but preferably the same.

The location of the first and second moth-eye layers and the protective layer is not especially limited as long as they can be viewed from an observer. The first and second moth-eye layers and the protective layer may be formed over the entire or part of the transparent window, but preferably at least on a portion through which the user views the observation objects. It is preferable that the first and second moth-eye layers and the protective layer are disposed over the entire (surface) of the transparent window in order to improve the visibility in a range as wide as possible.

The materials for the first and second moth-eye layers are not especially limited. It is preferable that the refractive index of each of the first and second moth-eye layers is substantially equivalent to that of the transparent window. More specifically, the difference in refractive index between the transparent wall and the first and second moth-eye layers is preferably 0.05 (more preferably 0.03) or smaller, and in this case, the reflection on the both interfaces can be hardly recognized.

The other optical characteristics of the first and second moth-eye layers are not especially limited and may be the same as those of common moth-eye films. The first and second moth-eye layers are preferably transparent to such a degree that the user can view the observation objects. More specifically, it is preferable that: the light transmittance is 90% (more preferably 95%) or higher; the haze is preferably 10% (more preferably 1%) or lower; the refractive index is 1.45 to 1.55 (more preferably 1.47 to 1.53).

Each of the first and second moth-eye layers may be (1) formed on the transparent window with a base film therebetween or may be (2) directly formed on the transparent window, from the same viewpoint as in Embodiment 1.

Another Embodiment of the present invention provides such an optical film. The present Embodiment provides an optical film attached to the external surface of the viewing device of Embodiment 2, i.e., the viewing device having a transparent window, the optical film including a moth-eye layer having a moth-eye structure (the above-mentioned first moth-eye layer) and a protective layer covering the moth-eye structure (the moth-eye structure of the above-mentioned first moth-eye layer).

The base film is preferably transparent to such a degree that the user can view the under-liquid objects. More specifically, it is preferable that the base film has a light transmittance of 90% (more preferably 95%) or higher, a haze of 10% (more preferably 1%) or lower, and a refractive index of 1.45 to 1.55 (more preferably 1.47 to 1.53).

The optical film of the present Embodiment is preferably a transparent film with transparency, waterproof property, and resistances to water and solvent (liquid). The optical characteristics of the entire optical film of the present Embodiment are not especially limited. The optical film is preferably transparent to such a degree that the user can view the under-liquid objects. More specifically, it is preferable that the optical film has a light transmittance of 90% (more preferably 95%) or higher and a haze of 10% (more preferably 1%) or lower.

According to the embodiment (1), it is preferable that the optical film of the present Embodiment has an adhesive paste on a (first or second) moth-eye layer-free-side surface of the base film, from the same viewpoint as in Embodiment 1. The adhesive paste (adhesive) is used for attaching the optical film of the present Embodiment to the viewing device readily, and preferably has transparency and water resistance.

It is that the protective layer has a refractive index substantially equivalent to that of a liquid to be in contact with the device. According to this, the effects of the present Embodiment can be more surely exhibited. More specifically, the difference in refractive index between the protective layer and the liquid is 0.05 (more preferably 0.03) or smaller. In this case, the reflection on the interface between the protective layer and the liquid can be hardly recognized. The refractive index of the protective layer is preferably within a range of the refractive index of liquid to be in contact with the viewing device ±0.05 (more preferably ±0.03).

The protective layer has a refractive index substantially equivalent to that of water. According to this, the viewing device of the present Embodiment can be preferably used as a device for observing underwater objects, i.e., a device for underwater observation. More specifically, the difference in refractive index between the protective layer and water is 0.05 (more preferably 0.03) or smaller. In this case, the reflection on the interface between the protective layer and the water can be hardly recognized.

The refractive index of water is about 1.33, and so it is preferable that the protective layer has a refractive index of 1.28 to 1.38 (more preferably 1.3 to 1.36) in view of suitably using the viewing device of the present Embodiment as a device for underwater observation.

According to the present Embodiment, the transparent members having a refractive index of about 1.5 such as a glass or transparent resin material can be preferably used as a material for the transparent window. Further, transparent members having a refractive index of about 1.5 such as a transparent resin material can be suitably used for the first moth-eye layer. These transparent members each have a refractive index larger than that of the liquid (e.g., 1.33 of water refractive index), generally. With a view to form the transparent window and the first moth-eye layer by the respective optimum materials and to easily make the refractive index of the content liquid equivalent to that of the protective layer, it is preferable that the protective layer has a refractive index smaller than that of each of the transparent window and the first moth-eye layer (transparent window).

The other optical characteristics of the protective layer is not especially limited. The protective layer is preferably transparent to such a degree that the user can view the under-liquid objects. More specifically, it is preferable that: the light transmittance is 90% (more preferably 95%) or higher; and the haze is preferably 10% (more preferably 1%) or lower.

It is preferable the protective layer contains a fluorine-containing resin. According to this, the protective layer can more surely protect the moth-eye structure, which is commonly poor in durability, and as a result, the durability of the viewing device of Embodiment 2 can be more improved. Since the refractive index of the fluorine-containing resin is generally about 1.3 to 1.4, the refractive index of the protective layer containing a fluorine-containing resin can be easily made equal to that of water. That is, according to this, the viewing device of the present Embodiment can be preferably used as a device for underwater observation.

The transparent window is transparent to such a degree that the user can view the under-liquid objects therethrough, and can be formed of a lens or a transparent plate commonly used in typical goggles or aquascopes. More specifically, it is preferable that the transparent window has a light transmittance of 90% (more preferably 95%) or higher and a haze of 10% (more preferably 1%) or lower. The refractive index of the transparent window is preferably, but not limited to, substantially equivalent to that of the base film of the moth-eye layer or the resin constituting the moth-eye structure. According to this, the effects of the present Embodiment can be sufficiently exhibited.

Examples of the material for the transparent window include, but not limited to, various glass materials and transparent resin (e.g., acrylic resin) materials. Such materials include those generally used for goggles or aquascopes.

The transparent window constitutes the entire or part of the viewing device of the present Embodiment.

As long as the user can view the under-liquid objects through the transparent window of the viewing device, the application of the device is not especially limited. Particularly preferable are a device for observing under-liquid objects from above the liquid level and a goggle. The former device preferably includes aquascopes. In the former device, the transparent window may be a transparent plate, and in the latter one, the transparent window may be a transparent lens. The viewing device may be a window or wall for underwater observation with which ships, in-water facilities, and the like are provided.

The kind and refractive index of the liquid are not especially limited and may be appropriately determined according to applications of the viewing device. Water, seawater, solvents, and the like are mentioned.

Example 1

Figure 2:
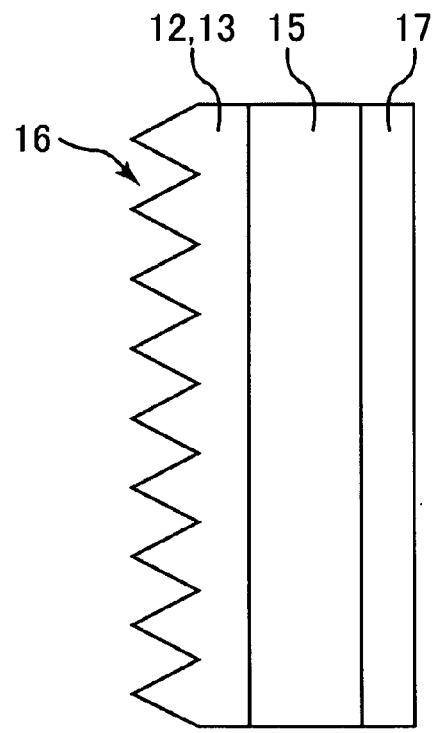
FIG. 2 is a cross-sectional view schematically showing a moth-eye layer of the liquid tank of Example 1.
Figure 3:
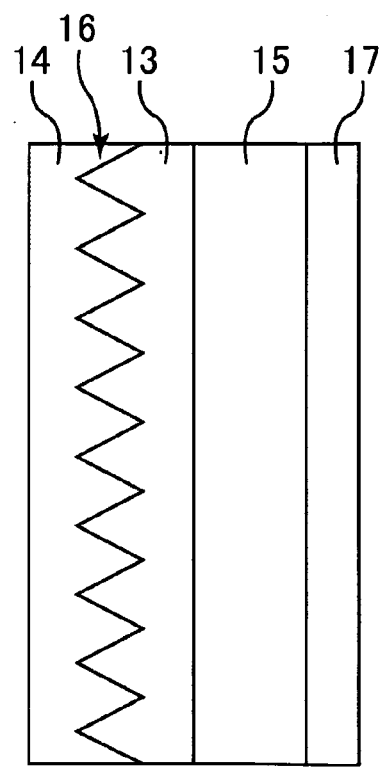
FIG. 3 is a cross-sectional view schematically showing the moth-eye layer and a protective layer in the liquid tank of Example 1.

FIG. 1 is a schematic view showing a liquid tank of Example 1. FIG. 1(a) is an overall cross-sectional view of the tank. FIG. 1(b) is an enlarged view of a region (side surface) surrounded by the broken line of FIG. 1(a). FIG. 2 is a cross-sectional view schematically showing a moth-eye layer of the liquid tank of Example 1. FIG. 3 is a cross-sectional view schematically showing the moth-eye layer and a protective layer in the liquid tank of Example 1.

The present Example relates to an embodiment in which the liquid tank of the present invention is used as a water tank. The water tank of the present Example has a multi-layer structure, as shown in FIG. 1, composed of: a transparent wall 11 constituting a container storing a content liquid, or water 21; a moth-eye layer (moth-eye film) 12 attached to the external surface (hereinafter, also referred to as an "A surface") of the transparent wall 11, which faces an observer 23; a moth-eye layer (moth-eye film) 13 attached to the internal surface (hereinafter, also referred to as a "B surface") of the wall 11; and a protective layer 14 coating the moth-eye layer 13. The transparent wall 11 is composed of a transparent glass plate. The moth-eye layer 12 has a moth-eye structure. The moth-eye layer 13 has a moth-eye structure and faces the moth-eye layer 12. The protective layer 14 is composed of a fluorine-containing resin (fluorine resin). The transparent wall 11 has a refractive index of about 1.5. The protective layer 14 has a refractive index of 1.28 to 1.38. The water 21 has a refractive index of 1.33.

The moth-eye layer 12 can prevent a mismatch in refractive index between air outside the water tank (refractive index of 1) and the transparent wall 11. Also on the internal side of the wall 11, the refractive index matching between the water 21 and the transparent wall 11 can be achieved. As a result, the observer 23 feels as if no wall of the water tank exists and experiences a feeling of being inside the tank. Further, when the water tank is photographed from the outside by strobe photography, the strobe light is not reflected on the refractive index interface. This can obviate the need of moving the camera close to the tank. Thus, the matching in refractive index can be achieved well when the moth-eye structure is formed on the B surface. On the other hand, the moth-eye structure has a surface very excellent in biocompatibility, so that underwater life easily adhere to the surface or stains on the surface are difficult to remove. This problem can be solved by coating a material whose refractive index is almost equivalent to that of the water 21 on the B surface of the moth-eye layer 13. As a result, the refractive index matching between the water 21 and the transparent glass wall 11 is achieved, and adhesion of stains including underwater life can be minimized. Even if once adhered to the wall 11, the stains can be easily removed therefrom with a commercially available cloth and the like. Moreover, the fluorine-containing resin layer protects the surface of the moth-eye layer 13 (the moth-eye structure), which is poor in durability, whereby the water tank can be used as a durable aquarium or observation tank. Since the refractive index of the fluorine-containing resin is generally about 1.3 to 1.4, the refractive index of the protective layer 14 containing a fluorine-containing resin can be easily made substantially equal to that of the water 21.

The moth-eye structure 16, with which the moth-eye layers 12 and 13 are provided, has protrusions. It is preferable that the protrusions are formed with a pitch of 50 nm to 300 nm and a height of 50 nm to 300 nm. The moth-eye layers 12 and 13 are each made of a material whose refractive index is substantially equivalent to that of the material for the transparent wall 11 of a glass or resin material.

In the present Example, CYTOP CTX809A (produced by ASAHI Glass Co., Ltd.) is used as the fluorine-containing resin material (fluorine coating material) for the protective layer 14. This resin is coated on the moth-eye layer 13 to form a layer with 0.5 μm in thickness. CYTOP CTX809A has a refractive index of 1.34, which is almost equivalent to that of water, or 1.33. Although in the single use of the moth-eye layer 13 the stains still easily adhere to the internal wall of the tank, the fluorine resin coating on the internal wall of the tank suppresses the stain adhesion and makes it easier to remove the stains from the wall. The adhesion between the moth-eye layer 13 and the protective layer 14 might be insufficient when the moth-eye layer 13 is composed of a polymer material and thereon the fluorine-resin coating is formed. In view of this, it is preferable that the moth-eye layer 13 surface is treated with a primer prior to the formation of the fluorine-resin coating. In this Example, a primer (CT-P10, by ASAHI Glass Co., Ltd.) exclusively for CYTOP CTX809A can be used.

Between the transparent wall 11 and each of the moth-eye layers 12 and 13, there are provided a base film 15 and an adhesive paste 17 disposed on the transparent wall 11-side main surface of the base film 15 as illustrated in FIG. 2. Thus each of the moth-eye layers 12 and 13 is formed by subjecting to nanoimprinting a film of a UV-curable resin and the like formed on the base film 15 and then attached to the transparent wall 11 with the adhesive paste 17. The moth-eye structure 16 of the layer 13 is coated with the protective layer 14 of a fluorine-containing resin (fluorine resin) as illustrated in FIG. 3. As mentioned above, attached is an optical film (film for the tank internal surface) composed of the protective layer 14, the moth-eye layer 13, the base film 15, and the adhesive paste 17 to the internal surface of the transparent wall 11; and to the external surface thereof, an optical film (film for the tank external surface) composed of the moth-eye layer 12, the base film 15, and the adhesive paste 17 is attached. When a moth-eye layer is disposed on the B surface side, the moth-eye layer 13, which is located on the internal side of the tank, preferably includes a material with excellent solvent resistance because it is under the presence of a solvent (solution) such as water. The base film 15 preferably is a film with transparency, water resistance, and solvent (liquid) resistance. Specifically, olefin films, including the above-mentioned commercially available ones, are suitably used. The refractive index of the base film 15 is preferably designed to be substantially equivalent to that of the transparent wall 11.

Figure 4:
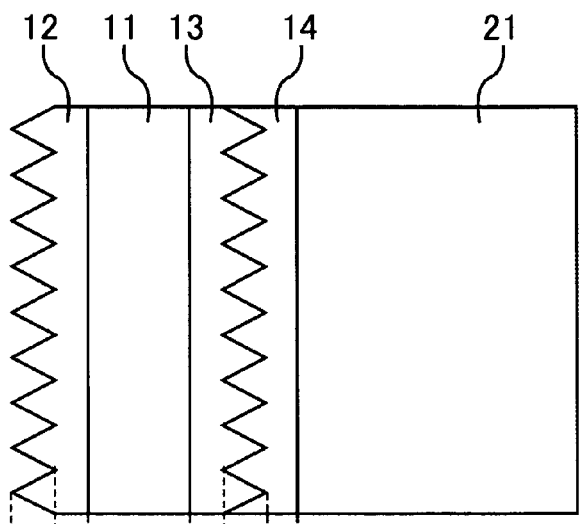
FIG. 4 is an explanation view of refractive index change in the liquid tank of Example 1.
Figure 4:
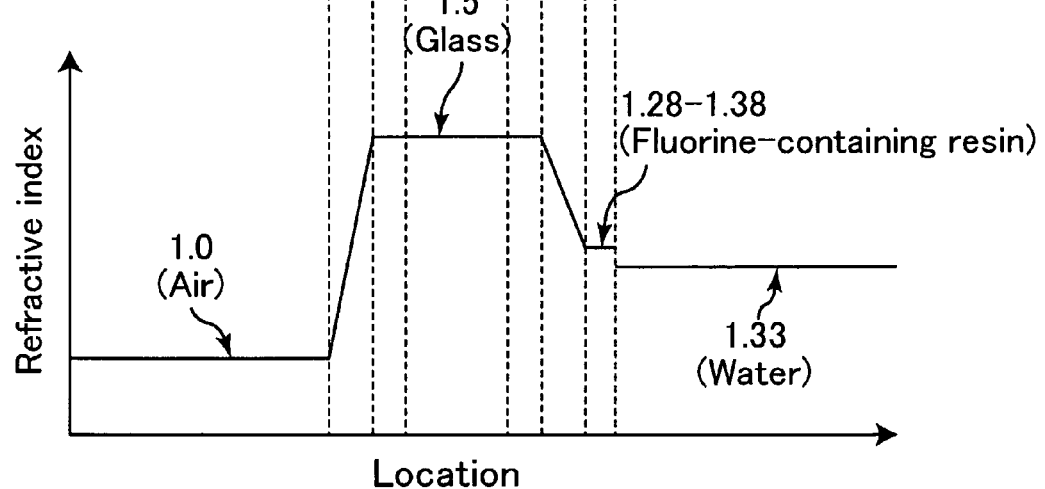

FIG. 4 is an explanation view of refractive index change in the liquid tank of Example 1. FIG. 4(a) is a side cross-sectional view of the tank. FIG. 4(b) is a graph showing refractive index change on a side surface of the tank. In the tank of the present Example, as shown in FIGS. 4(a) and 4(b), the moth-eye layers 12 and 13 are disposed at a portion facing the observer of the A and B surfaces of the transparent wall 11 respectively whereby the refractive index matching can be ensured with the solution (the water 21) being charged in the tank. Particularly the refractive index matching on the B surface side is achieved using a fluorine-containing material with a low refractive index for the protective layer 14. Thus, the protective layer 14 can be coated successfully while a mismatch of the refractive index on the interface between the water and the resin layer is minimized. Further, the treatment for the refractive index matching with the solution (the water 21) and the moth-eye structure enable the refractive index to continuously change from air 22 (the refractive index is 1) to the water 21 (the refractive index is 1.33), and as a result, the portion facing the observer of the wall 11 behaves as if no interface existed. Reflected light on this portion have a very flat wavelength dispersion characteristic and is less colored. Thus the coloring hardly occurs because the moth-eye structure requires no λ/4 conditions unlike the multi-layer film and because the refractive index continuously changes from the surface of the moth-eye structure to the inside thereof. The reflectance on the moth-eye structure surface can be extremely decreased because the light does not recognize the moth-eye structure surface as a refractive index interface. Moreover, the fluorine-containing resin layer (with a refractive index substantially equivalent to that of the solvent (e.g., 1.33 when the solvent is water)) is disposed on the B surface, which can ease the poor resistance to stains such as underwater life and the difficulty in removal of the stains of the nanostructure (nanometer-sized protrusions) of the moth-eye structure and which can dramatically increase the durability of the B surface.

Example 2

Figure 5:
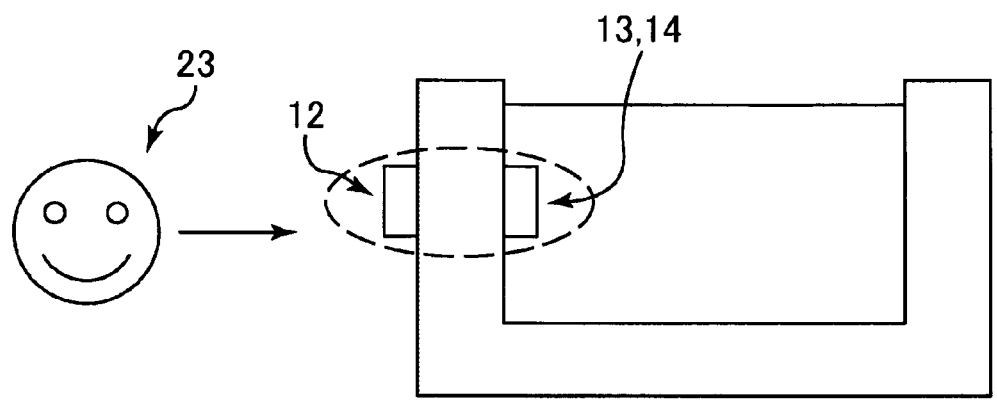
FIG. 5 is a schematic view showing the liquid tank of Example 2.
Figure 5:

FIG. 5 is a schematic view showing the liquid tank of Example 2. FIG. 5(a) is an overall cross-sectional view of the tank. FIG. 5(b) is an enlarged view of a region (side surface) surrounded by the broken line of FIG. 5(a).

The present Example employs exactly the principle of Example 1, but the films for the tank internal surface and for the tank external surface are each disposed on part of the tank by patterning. Specifically, as shown in FIG. 5, the moth-eye layer 12 on the A surface, and the moth-eye layer 13 and the protective layer 14 on the B surface, each of which is disposed on the transparent wall 11 with the base film and the adhesive paste therebetween, are patterned into the same planar shape. As a result, the observer 23 feels as if no transparent wall 11 existed at the pattern portion and he could enter the tank. Thus the display effects like this can be obtained.

The pattern shape includes, but not limited to, a circular or square shape in consideration of the viewing window shape. Alternatively, the layers are patterned to express some character or logo for advertisement, for example. When the layers are patterned to express some character, it looks as if no interface exists on the layer-provided portion, but therearound, light reflection occurs. This difference between the two portions brings higher display effects.

Example 3

Figure 6:
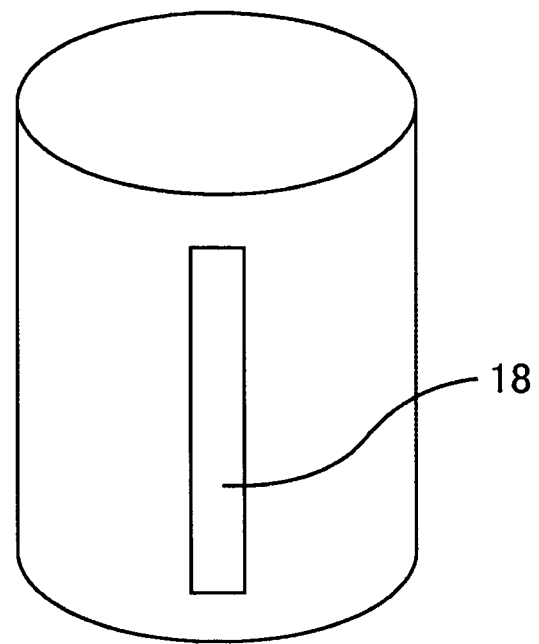
FIG. 6 is a perspective view schematically showing a liquid tank of Example 3.
Figure 7:
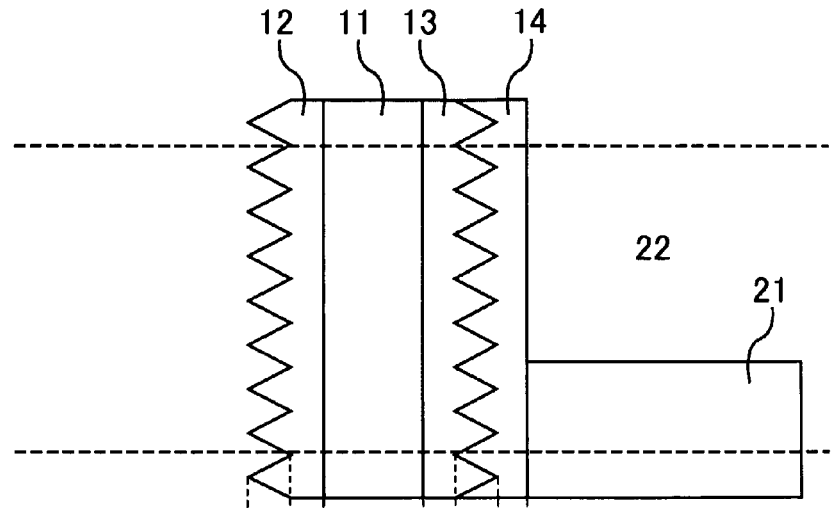
FIG. 7 is an explanation view of refractive index change in the liquid tank of Example 3.
Figure 7:
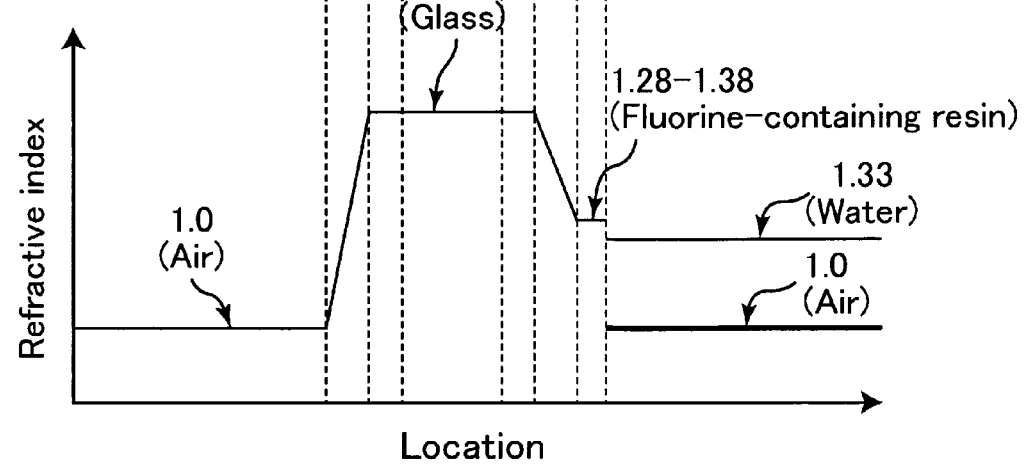

FIG. 6 is a perspective view schematically showing a liquid tank of Example 3. FIG. 7 is an explanation view of refractive index change in the liquid tank of Example 3. FIG. 7(a) is a cross-sectional view of a liquid volume meter portion of the liquid tank. FIG. 7(b) is a graph showing refractive index change in the liquid volume meter portion.

In the present Example, the liquid tank of the present invention is applied to a tank equipped with a viewing window as a liquid volume meter through which the liquid level can be determined. A liquid volume meter 18 is disposed at part of the tank, as shown in FIG. 6. The films for tank internal and external surfaces are each attached to the liquid volume meter portion, similarly to Example 1. More specifically, the liquid volume meter portion of the tank of the present Example has a multi-layer structure composed of: a transparent wall 11; a moth-eye layer 12 attached to the external surface (A surface) of the transparent wall 11 and having a moth-eye structure; a moth-eye layer 13 attached to the internal surface (B surface) of the wall 11 and disposed in a region facing the moth-eye layer 12; and the protective layer 14 coating the moth-eye layer 13 and composed of a fluorine-containing resin (fluorine resin). FIG. 7 illustrates that the level of the content liquid (the water 21) reaches a certain level of the liquid volume meter 18.

The B surface allows refractive index matching below the liquid level (the water 21 level), but does not allow it thereabove, i.e., at the portion exposing to air 22, as shown in FIG. 7(b). Specifically, the reflection is suppressed in the region below the liquid level where the refractive index is matched, and on the other hand, the reflection occurs in the region thereabove where the refractive index is mismatched. This difference in occurrence of the reflection makes it easy to determine the height of the liquid level. The A surface is also provided with the moth-eye structure, so that the external-surface reflection can be almost completely prevented and as a result, the liquid level height can be more easily determined.

When the protective layer 14 is not disposed on the moth-eye layer 13, the moth-eye structure is directly exposed to air above the liquid level. This region also continuously changes the refractive index to diminish the reflected light. As a result, the internal-surface reflection is suppressed both above and below the liquid level, and the interface between the liquid and air becomes unclear. In contrast to this, when the protective layer 14 is disposed on the moth-eye layer 13, the light reflection occurs on the interface between the air 22 and the protective layer 14 above the liquid level. Thus, the liquid level can be clearly determined as mentioned above.

When the liquid volume meter is not equipped with the films for tank internal and external surfaces, the mismatch of the refractive index occurs both above and below the liquid level. The degree of the mismatch is different between the two regions, resulting in a difference in reflectance therebetween. In this case, therefore, the liquid level is not so clearly viewed as in the liquid volume meter of Example 3, although barely determined.

As mentioned above, in Examples 1 to 3, the matching of refractive index on the side surface of the transparent wall of the tank can be achieved with the moth-eye structure and the resin with a low refractive index. The light reflection can be suppressed as much as possible, and thus objects (aquarium fishes, liquid level, and the like) inside the tank can be clearly observed.

Example 4

Figure 11:
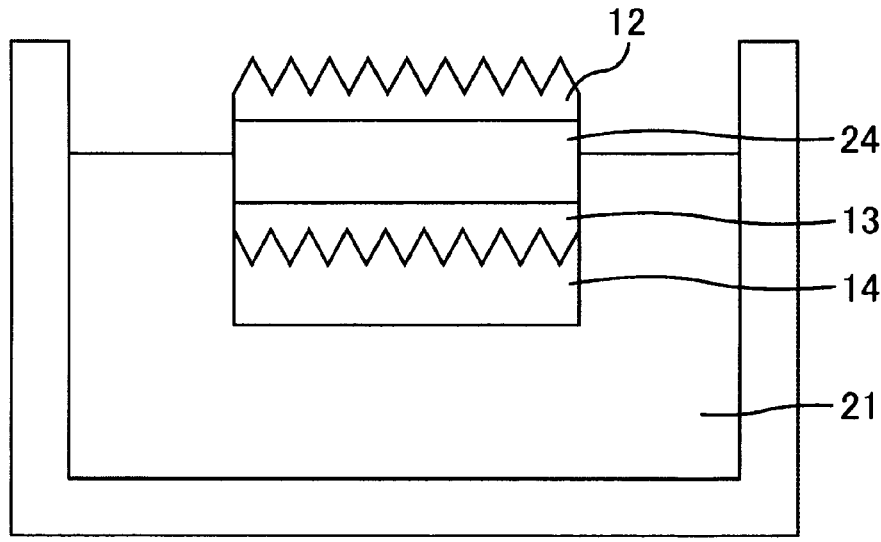
FIG. 11 is a cross-sectional view schematically showing a viewing device for under-liquid observation of Example 4.
Figure 12:
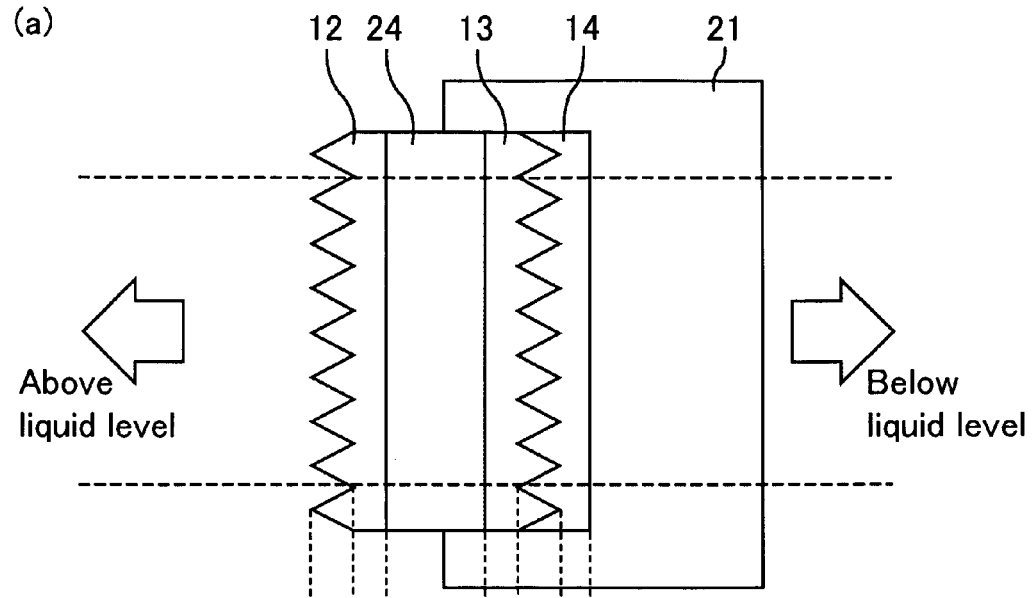
FIG. 12 is an explanation view of refractive index change in the viewing device of Example 4.
Figure 12:
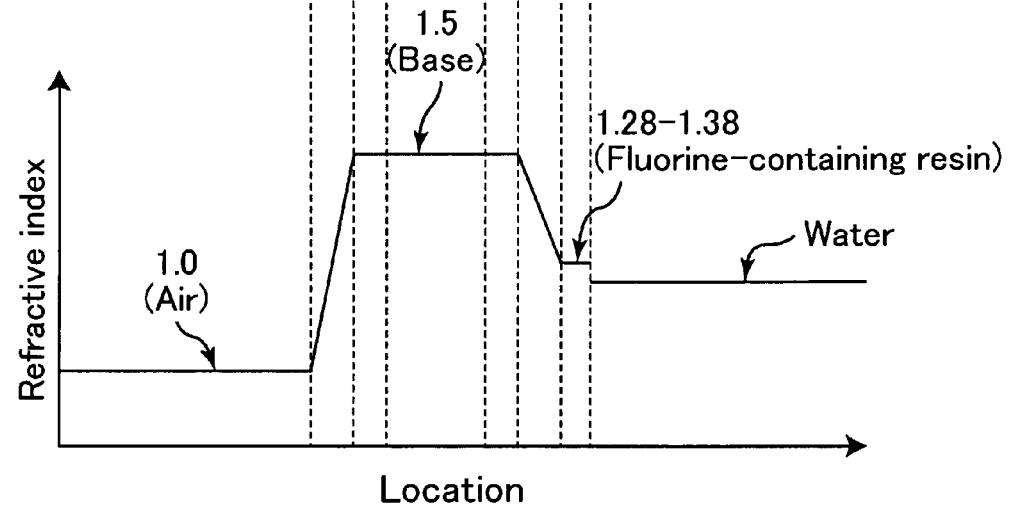
Figure 13:
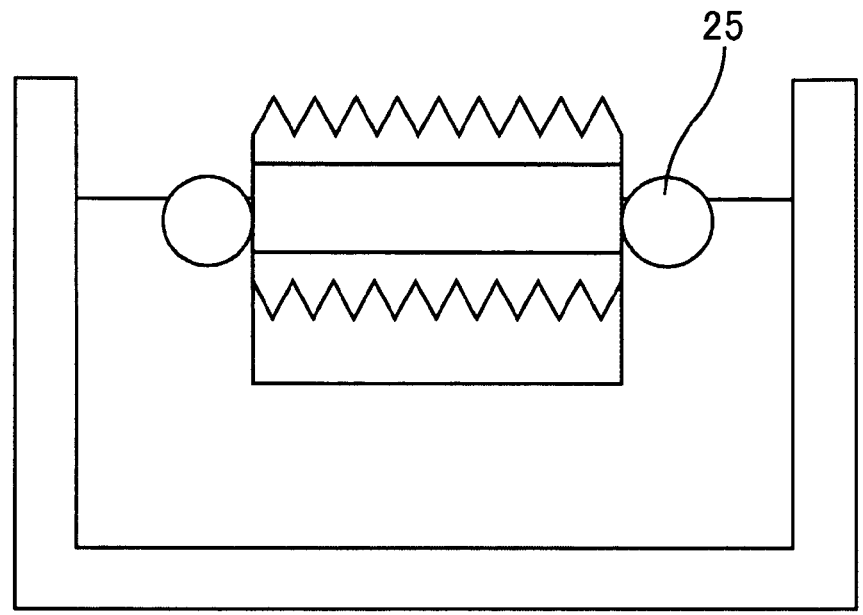
FIG. 13 is a cross-sectional view schematically showing the device of Example 4 in accordance with a modified example.
Figure 14:
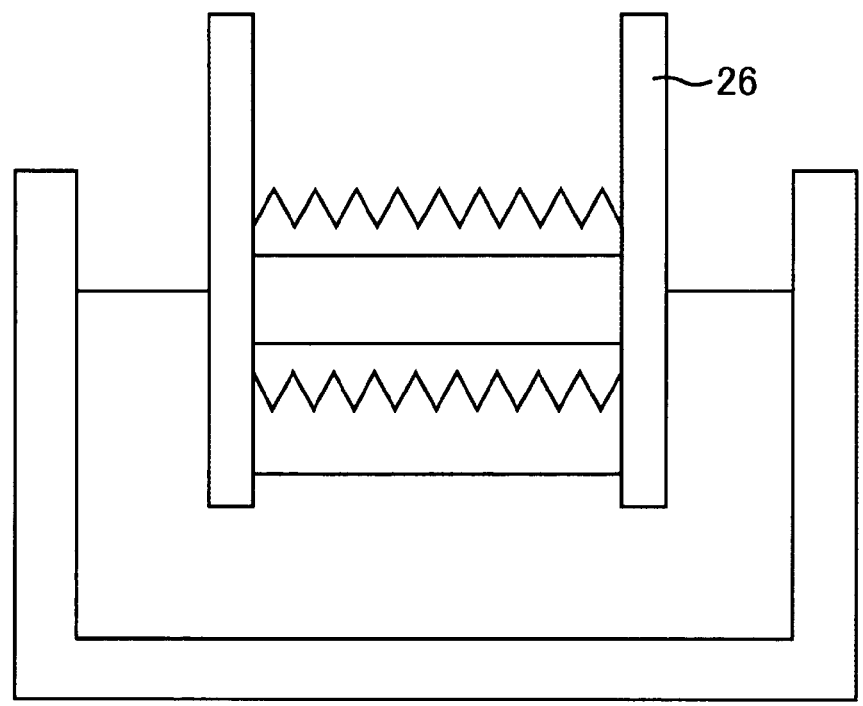
FIG. 14 is a cross-sectional view schematically showing the device of Example 4 in accordance with another modified example.

FIG. 11 is a cross-sectional view schematically showing a viewing device for under-liquid observation of Example 4. FIG. 12 is an explanation view of refractive index change in the viewing device of Example 4. FIG. 12(a) is a cross-sectional view of the device. FIG. 12(b) is a graph showing refractive index change in the device. FIGS. 13 and 14 are cross-sectional views each schematically the device of Example 4 in accordance with a modified example.

In the present Example, the viewing device of the present invention is applied to a device through which a user views under-liquid objects above the liquid level. The device of the present Example has the following multi-layer structure composed of:

a transparent plate-like base (transparent window) 24;
a moth-eye layer 12 attached to the surface exposed to air (the top) of the base 24 and having a moth-eye structure; a moth-eye layer 13 attached to the liquid (water)-side surface (the bottom) of the base 24 and disposed in a region facing the moth-eye layer 12; and a protective layer 14 of a fluorine-containing resin (fluorine resin) coating the moth-eye layer 13. The base 24 is made of a glass or resin material and the like, and has a refractive index of about 1.5. The device of the present Example is used with the protective layer 14 being in contact with the liquid and the moth-eye layer 12 being in contact with the atmosphere. Accordingly, it is preferable that the respective members of the present Example are made of materials with a specific gravity lower than that of the liquid.

In the present Example, the moth-eye films are attached to the respective surfaces of the base 24, and on the moth-eye film that is to be exposed to liquid, the protective layer 14 of a resin with a low refractive index is disposed. When this device is floated on the surface of the liquid, as shown in FIG. 12, the both surface allow the refractive index matching, and the refractive index continuously changes from air (refractive index of 1) to water 21 (refractive index of 1.33). Thus the refractive index mismatch on the liquid surface can be solved. As a result, underwater objects can be clearly viewed from above the liquid level. Further, since this Example employs the fluorine resin as a material for the protective layer 14, similarly to Examples 1 to 3, the device can suppress from being contaminated by the liquid and can achieve the refractive index matching also on the bottom thereof.

A float 25 with a lower specific gravity than that of the liquid may be disposed around the device of the present Example (for example, around the base 24), as shown in FIG. 13. This allows using materials with a higher specific gravity than that of the liquid for the members such as the base 24.

The device of the present Example may be equipped with a light-shielding cylindrical member 26 as shown in FIG. 14 to be used as an aquascope. One opening of the cylindrical member 26 is closed with a transparent portion such as the base 24. This can suppress incident of ambient light into the transparent portion so that observation objects can be more clearly viewed. Further, the gravity of the cylindrical member 26 can be made lower than that of the liquid, whereby materials with a specific gravity higher than that of the liquid can be used for the members such as the base 24.

The application of the device of the present Example is not especially limited. The device may be used for underwater or undersea observation, or alternatively, for viewing an indicator inside an apparatus containing a solvent or checking behavior of such an apparatus.

Example 5

Figure 15:
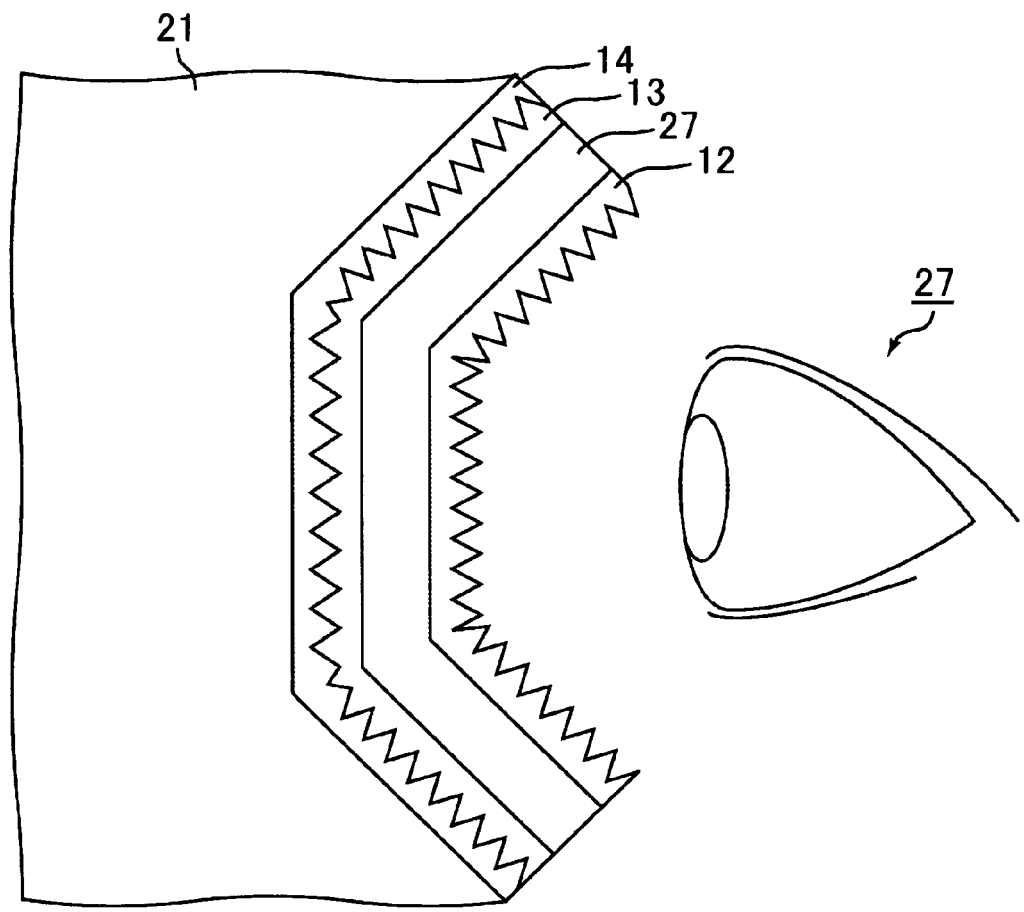
FIG. 15 is a cross-sectional view schematically showing a viewing device for under-liquid observation of Example 5.
Figure 16:
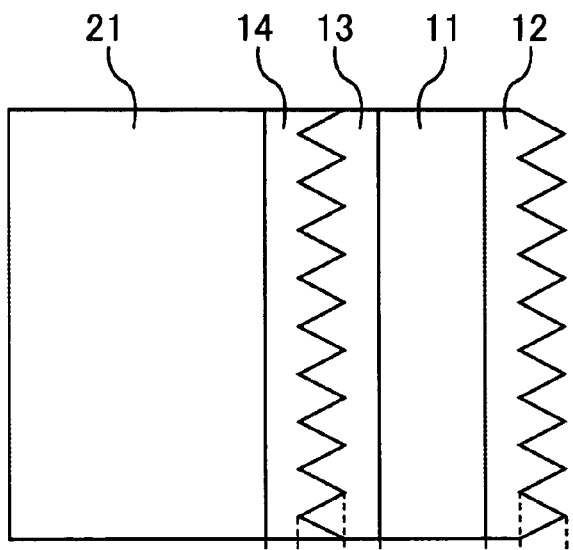
FIG. 16 is an explanation view of refractive index change in the device of Example 5.
Figure 16:
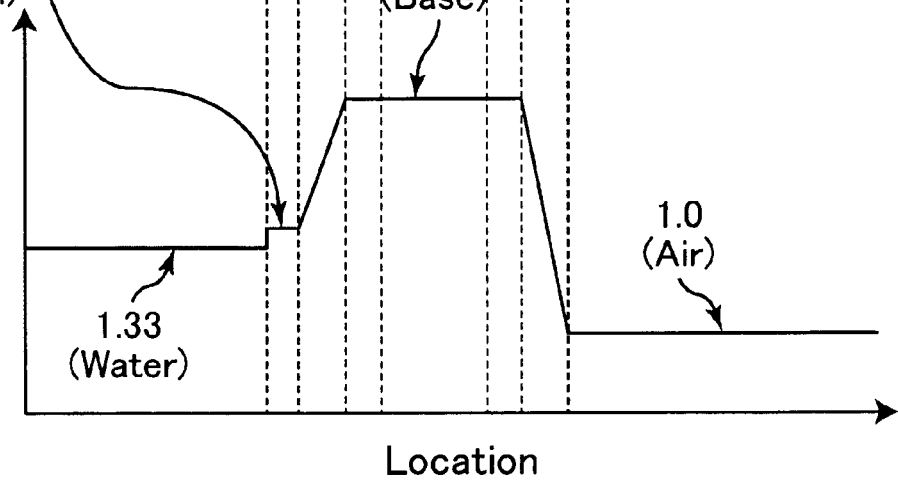

FIG. 15 is a cross-sectional view schematically showing a viewing device for under-liquid observation of Example 5. FIG. 16 is an explanation view of refractive index change in the device of Example 5. FIG. 16(a) is a cross-sectional view of the device. FIG. 16(b) is a graph showing refractive index change in the device.

In the present Example, the viewing device of the present invention is applied to goggles. The lens part of the goggles of the present Example has the following multi-layer structure composed of a transparent base (transparent window) 27; a moth-eye layer 12 attached to the internal surface of the base 27 (the user 27-side surface) and having a moth-eye structure; a moth-eye layer 13 attached to the liquid (water 21)-side surface (the external surface) thereof and disposed in a region facing the moth-eye layer 12; and the protective layer 14 of a fluorine-containing resin (fluorine resin) coating the moth-eye layer 13. The base 27 is composed of a glass or resin material, and the like, and has a refractive index of about 1.5. The goggles of the present Example are used with the protective layer 14 being in contact with the liquid and the moth-eye layer 12 being with air.

In the present Example, the moth-eye films are attached to the respective surfaces of the base 27, and on the moth-eye film that is to be exposed to liquid, the protective layer 14 of a resin with a low refractive index is disposed. In underwater observation by means of the goggles of the present Example, as shown in FIG. 16, the both surface can achieve the matching of the refractive index, and the refractive index can be continuously changed from the water 21 (the refractive index is 1.33) to air (the refractive index of 1), finally to just in front of user's (observer's) eyes. The user can view objects present in the water naturally and clearly like fishes do.

The moth-eye layer 12 surface may be provided with a water-shedding treatment to such a degree that the moth-eye structure does not completely lose its undulated pattern, although the above effects can be exhibited without the treatment. This allows easy removal of water from the lens inner surface.

The moth-eye layer 12 surface may be provided with hydrophilicity. In this case, even when water enters the inside of the lens part and comes in contact with the moth-eye layer 12, the water can be spread over the layer 12 surface to form a water film thereon. Thus, fogging of the goggles can be suppressed.

The goggles of the present Example may be those for athletic use, hobby use, or fishing industries, and the application thereof is not especially limited.

Also in Examples 4 and 5, a base film and an adhesive paste are disposed in this order on the base 24 or 27-side main surface of each of the moth-eye layers 12 and 13, similarly to Examples 1 to 3. Thus, the optical film composed of the protective layer 14, the moth-eye layer 13, the base film, and the adhesive paste is attached to the bottom of the base 24 or the external surface of the base 27, and on the top of the base 24 or the internal surface of the base 27, the optical film composed of the moth-eye layer 12, the base film, and the adhesive paste is attached.

The present application claims priority to Patent Application No. 2008-329996 filed in Japan on Dec. 25, 2008 under the Paris convention and provisions of national law in a designated State, the entire contents of which are hereby incorporated by reference.

EXPLANATION OF NUMERALS AND SYMBOLS

11: Transparent wall
12: Moth-eye layer
13: Moth-eye layer
14: Protective layer
15: Base film
16: Moth-eye structure
17: Adhesive paste 18: Liquid volume meter
19: Protrusion
21: Water
22: Air
23: Observer
24, 27: Base
25: Float
36: Cylindrical member
27: User
31: Stain
32: Fiber

The invention claimed is:

1. A liquid tank having a transparent wall, comprising,
a first moth-eye layer having a first surface in direct contact with an internal surface of the transparent wall and a second surface having a moth-eye structure opposite the internal surface of the transparent wall,
a protective layer on the moth-eye structure, the protective layer having a refractive index substantially equivalent to that of a liquid to be stored in the tank,
wherein the protective layer is configured to simultaneously contact the liquid and air above the liquid, and
a second moth-eye layer having a first surface in direct contact with an external surface of the transparent wall and a second surface having a moth-eye structure opposite the external surface of the transparent wall, wherein the second moth-eye layer is disposed in a region facing the first moth-eye layer and wherein the moth-eye structure of the second moth-eye layer is directly exposed to air, wherein
the refractive index of the protective layer is different from that of the air.

2. A viewing device having a transparent window for under-liquid observation, the device comprising,
a first moth-eye layer having a first surface in direct contact with an outer surface of the transparent window and a second surface having a first moth-eye structure on an outer surface of the transparent window;
a protective layer covering the first moth-eye structure, the protective layer configured to be in direct contact with a liquid; and
a second moth-eye layer having a first surface in direct contact with an inner surface of the transparent window and a second surface having a second moth-eye structure, the second moth-eye structure configured to be in direct contact with air,
wherein the viewing device is not for storing a liquid in itself.

3. The viewing device according to claim 2, wherein the protective layer contains a fluorine-containing resin.

4. The viewing device according to claim 2,
wherein the protective layer has a refractive index substantially equivalent to that of a liquid to be in contact with the device.

5. The viewing device according to claim 2, wherein the protective layer has a refractive index substantially equivalent to that of water.

6. The viewing device according to claim 2, wherein the protective layer has a refractive index smaller than that of each of the transparent window and the first moth-eye layer.

7. The viewing device according to claim 2, wherein the protective layer has a refractive index of 1.28 to 1.38.

* * * * *